(12) United States Patent
Ehrenfels

(10) Patent No.: US 9,735,559 B2
(45) Date of Patent: Aug. 15, 2017

(54) CABLE SET HOLDER FOR A MOTOR VEHICLE AND MOTOR VEHICLE WITH CABLE SET HOLDER

(71) Applicant: GM GLOBAL TECHNOLOGY OPERATIONS LLC, Detroit, MI (US)

(72) Inventor: Stefan Ehrenfels, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/183,041

(22) Filed: Jun. 15, 2016

(65) Prior Publication Data
US 2016/0365716 A1 Dec. 15, 2016

(30) Foreign Application Priority Data
Jun. 15, 2015 (DE) .................... 10 2015 007 630

(51) Int. Cl.
| | | |
|---|---|---|
| *H01B 7/00* | (2006.01) | |
| *H02G 3/32* | (2006.01) | |
| *H01B 17/14* | (2006.01) | |
| *H02G 3/02* | (2006.01) | |
| *B60R 16/02* | (2006.01) | |

(52) U.S. Cl.
CPC ............ *H02G 3/32* (2013.01); *B60R 16/0215* (2013.01); *H01B 17/14* (2013.01); *H02G 3/02* (2013.01)

(58) Field of Classification Search
CPC .. H02G 3/32; H02G 3/02; H02G 3/36; H02G 3/00; B60R 16/0215; H01B 17/14; H01B 17/16; F16L 3/12; F16L 5/00; F16L 3/1233; F16L 3/1075

USPC ............ 174/40 CC, 68.1, 68.3, 135, 92; 248/74.1, 49, 65, 70, 59, 62, 74.2, 74.4; 138/111, 112, 118, 118.1
See application file for complete search history.

(56) References Cited

U.S. PATENT DOCUMENTS

| | | | | |
|---|---|---|---|---|
| 2,338,006 | A * | 12/1943 | Morehouse | ........... F16L 3/1233 174/40 CC |
| 2,408,572 | A * | 10/1946 | Morehouse | ........... F16L 3/1233 174/40 CC |
| 3,695,324 | A | 10/1972 | Gulistan | |
| 4,591,229 | A * | 5/1986 | Sachs | ........................ H01R 4/60 439/795 |
| 6,398,596 | B1 * | 6/2002 | Malin | ........................ H01R 4/42 174/78 |
| 6,933,442 | B2 * | 8/2005 | Franks, Jr. | ............. H01R 4/643 174/135 |
| 8,235,332 | B2 * | 8/2012 | Cesarino | ............... F16L 3/1233 248/74.1 |

(Continued)

FOREIGN PATENT DOCUMENTS

| | | |
|---|---|---|
| DE | 3807001 A1 | 9/1989 |
| DE | 19726331 A1 | 1/1998 |
| DE | 20102930 U1 | 5/2001 |

*Primary Examiner* — Angel R Estrada
(74) *Attorney, Agent, or Firm* — Lorenz & Kopf LLP

(57) ABSTRACT

A cable set holder is disclosed for fastening a cable or cable set to a motor vehicle and in particular a vehicle body. The cable set holder includes a cable mounting portion configured to hold one or more cables, and a fastening portion configured to fix the cable set holder on a body component of the motor vehicle. A nut is arranged in a loss-preventing manner on the fastening portion of the cable set holder.

11 Claims, 1 Drawing Sheet

(56) References Cited

U.S. PATENT DOCUMENTS

| | | | |
|---|---|---|---|
| 8,759,682 B2* | 6/2014 | Devouge | F16L 3/12 174/135 |
| 8,833,706 B2* | 9/2014 | Elsmore | F16L 3/1075 248/74.1 |
| 8,979,039 B2* | 3/2015 | Shiga | F16L 55/035 174/40 CC |

* cited by examiner

CABLE SET HOLDER FOR A MOTOR VEHICLE AND MOTOR VEHICLE WITH CABLE SET HOLDER

CROSS-REFERENCE TO RELATED APPLICATION

This application claims priority to German Patent Application No. 102015007630.2, filed Jun. 15, 2015, which is incorporated herein by reference in its entirety.

TECHNICAL FIELD

The present disclosure pertains to a cable set holder for a motor vehicle and a corresponding motor vehicle. The cable set holder includes a body having a cable mounting, which is configured to hold one or more cables. Furthermore, a fastening is provided for fixing the cable set holder to a bodywork component of the motor vehicle.

BACKGROUND

In motor vehicles, a large number of cables have to be installed the total length of which is considerable and because of the increase of electrically operated components and because of the increasing networking within the motor vehicle has substantially increased in the past decades. In order to install the cables in an orderly fashion, these are mostly combined into cable harnesses or cable sets which are routed along certain and planned paths.

For bundling the cables of a cable set and for holding the cable sets on the vehicle, clips, cable ties, but also cable set holders are used. Known cable set holders include a portion with which the cables can be held and at least one portion with which the cable set holder can be fastened to the motor vehicle. For fastening known cable set holders, different variants are possible. Among other things, screws can be used for this purpose, which are introduced through suitable recesses in the holding portion of the known cable set holders and screwed into a thread formed on the motor vehicle.

Alternatively to this it is known to fix cable set holders on studs, which are arranged on bodywork parts of the motor vehicle. For this purpose, a cable set holder is initially pushed onto the stud and then fixed. This can take place in various ways, mostly releasable connections are selected because of the maintenance possibility. One of the possible versions consists in a nut screwed onto the stud.

Some cable sets are installed on an underfloor of the motor vehicle. In particular in the case of cable net holders, which are mounted suspended or overhead, the assembly constitutes a major challenge since the assembler has to simultaneously hold and coordinate the cable set holder, the nut and an assembly tool. Because of the proneness to error of this process, in particular because the nut can fall down or the cable set holder can fall down or be canted, this process is not optimal.

By way of remedy it is known to provisionally pre-engage a cable set holder on a corresponding stud in order to achieve a temporary fastening of the cable set holder. The assembler then has two hands available with which he can hold a nut and a tool in order to screw on the nut and thereby fasten the cable set holder. During the step of the intermediate fixing however pulling the cable set holder askew occurs more frequently, as a result of which during fixing with the screw damage to the cable set holder can be caused. The consequence of this is that the lifespan of corresponding cable set holders is reduced and because of this an earlier replacement is possibly required.

Thus, there is a need to further develop cable set holders and motor vehicles of the aforementioned type no that a simple overhead assembly is possible without damaging the cable set holder.

SUMMARY

In accordance with the present disclosure, a cable set holder as described here is intended for fastening one or more cables to a motor vehicle. The cable set holder includes a body with a cable mounting. The cable mounting is designed in order to hold the one or the more cables. Furthermore, a fastening is provided on the body, which is designed in order to fix the cable set holder on a bodywork component of the motor vehicle. Furthermore, a nut is arranged on the body of the cable set holder in a manner that prevents loss.

Because of the fact that the nut is arranged on the cable set holder body in a manner that prevents loss, the process steps of the arranging of the cable set holder body and of the arranging the nut can be combined into a single step, which saves assembly time in the production. On the other hand it can be achieved that the rate of defective assembly steps which are caused by the dropping nuts is substantially reduced since the nut is arranged on the cable set holder in a manner that prevents loss.

The cable set mounting may be designed for holding the cable or the cables in a positively joined manner, for example by encompassing. The bodywork component may include a stud, in particular a threaded stud, in particular a threaded welded stud.

A further advantage resulting from the cable set holder described here is that the probability of damage to the cable set holder through the intermediate assembly of the cable set holder on a stud is reduced since this step becomes superfluous. Since the cable set holder need not be intermediate-engaged on a stud, the same cannot be wedged in and be damaged by being wedged in.

The assembly of the cable set holder described here is simpler compared with previous assembly instructions, the cable set holder merely has to be arranged and tightened by screwing onto the corresponding stud. When using suitable assembly tools, this can under certain conditions take place even singlehandedly when the nut can be held in the assembly tool. At least, however, perfect assembly utilizing two hands is possible when one hand holds the tool with the help of which the nut is fixed and the other hand simultaneously holds either the body of the cable set holder or the cable or the cable set, which is held with the help of the cable set holder.

In a first further configuration, the nut can be captively arranged. Compared with a loss-preventing arrangement this brings with it on the one hand the disadvantage of the impossible replacement of the nut while on the other hand during the handling of the cable set holder, for example during the transport, falling down of the nut is prevented. This disadvantage can be positively accepted when the costs of the cable set holder as a whole are relatively low.

According to another further aspect, the nut can be held in a cage. By arranging the nut in a cage it is possible that the nut is held rotatably relative to the body of the cable set. In addition, the cage can be dimensioned so that the nut has a defined play relative to the body, which can facilitate the assembly of the cable set.

According to a further configuration of the cable set holder, retaining in a cage can be achieved in that the nut includes a flange or a collar the diameter of which is larger than a clear width of the cage. By way of a corresponding flange or collar, a positively joined mounting can be ensured.

A further aspect beyond this can provide that the nut includes a body projecting from the cage. The body is formed with a screw drive feature such as a hexagonal or other polygonal shape, a Torx® or star point shape or another drive configuration, which permits transmitting a torque required for screwing on to the nut with the help of a tool. Because of the fact that the body projects from the cage it can be achieved that the nut can be actuated with the help of an axially fittable tool which permits the use of rotationally driven tools, for example compressed-air screwdrivers.

According to a further aspect of the cable set holder described here it can be provided that the nut is arranged on the fastening. Because of this, a compact configuration of the cable set holder can be achieved.

Another further aspect provides that the described cable set holder includes a compensation. When fixing the cable set holder, compensation allows adjusting the relative position of the cable set holder to the fixing location, in particular to the stud. By way of the compensation, certain deviations of the position of the stud to a predetermined position can be offset so that the course of the cable or cables is not negatively affected. Tolerances in the course of the cable, which can result through cable length tolerances or strength tolerances in the cable can be compensated with the help of a compensation. Other tolerances can materialize through the position of the cable set holder on the cable, which can likewise be offset.

Another aspect of the described cable set holder can provide that the fastening includes a bore which is formed in the axial direction of the nut and which overlaps with a thread of the nut. In this way, a stud can be passed through the bore and received by the thread of the nut, which makes possible tightening the nut by screwing. The cable set holder is then fixed, in particular clamped to the bodywork component by the nut.

According to a further aspect, a compensation can be brought about in that the bore is an elongated hole. Accordingly, the relative position of the nut to the cable set holder can be any along the elongated hole so that the cable set holder with fixed nut can assume various positions. By providing an elongated hole, the fixing of the cable set holder on the stud is facilitated in practice.

In configurations in which the cable set holder includes a cage, the relative position of the nut to the body can be determined by the geometry of the cage. The cage can be configured among other things so that a shifting of the out in radial direction (based on the axial direction of the nut) is possible.

According to another further aspect of the present cable set holder, the cable mounting can be designed as closed or closable ring. The ring can have a clear inner diameter, which is dependent on the diameter of the cable or cables to be held. A usual endeavor is to route the cable rattle-free, which can be achieved by a seat without play or a clamping seat. A configuration of the cable mounting as closed or closable ring makes possible a captive holding of the cable or cables in the cable mounting. Unlike than is the case with open rings, unexpected and undesirable pulling off of the cable or cables or parts thereof with closed rings need not be expected then. The use of a closable ring facilitates the assembly of the cable set holder on the cable or cables since the cable set holder need not be pushed on the cable or cables but can be fixed in the appropriate location. In particular for the replacement of a defective cable set holder during a repair of the motor vehicle, a closable ring can be advantageous.

The closure can be designed as a one-off closure, for example by establishing a positively joined connection in the manner of a cable tie. On the other hand, it can also be configured in such a manner that opening is possible, in particular only by using a suitable tool.

In a further configuration it can be provided that the ring consists of plastic. Rings made of plastic have advantages with respect to their weathering characteristics since they are insensitive to corrosion. At the same time, corrosion caused by electrochemical processes on other components of the motor vehicle can be avoided.

Another further aspect of the cable set holder provides that the body is of the multi-part type. Multi-part bodies permit more complex designs, in particular when the body is to be injection-molded. In addition, multiple parts can be configured moveable relative to one another in the case of multi-part bodies.

A further aspect beyond this provides a clamping device for pre-engagement on the bodywork component. With the help of this clamping device, the cable set holder can be provisionally fixed to the bodywork component, e.g. stud, which facilitates the coordination of further assembly steps. Accordingly, a heavy cable harness for example can be brought into position with two hands and clamped tight, the tool picked up and subsequently a final fastening of the cable set holder on the motor vehicle carried out.

In another embodiment, the present disclosure relates to a motor vehicle. The motor vehicle includes at least one cable set holder of the type described before.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
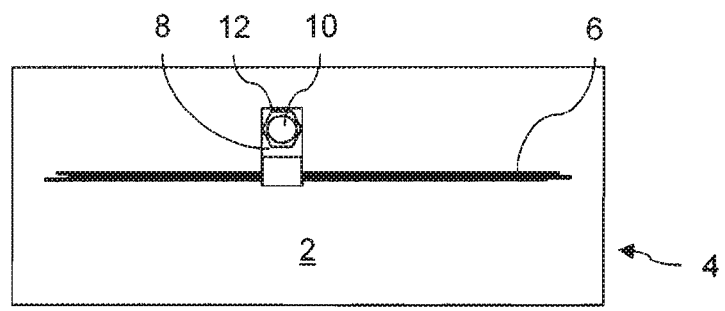
FIG. 1 is a view of an enlarged extract of an underfloor of a motor vehicle with cable set holder.

FIG. 1 shows an extract of an underfloor 2 of a motor vehicle 4. On the underfloor 2, a cable harness 6 is routed. The cable harness 6 is held with the help of a cable set holder 8. The cable set holder 8 is fixed on a stud 10. The stud 10 is embodied as welded stud and has a thread. For fixing the cable set holder 8, a nut 12 is provided which is screwed onto the stud 10.

Figure 2:
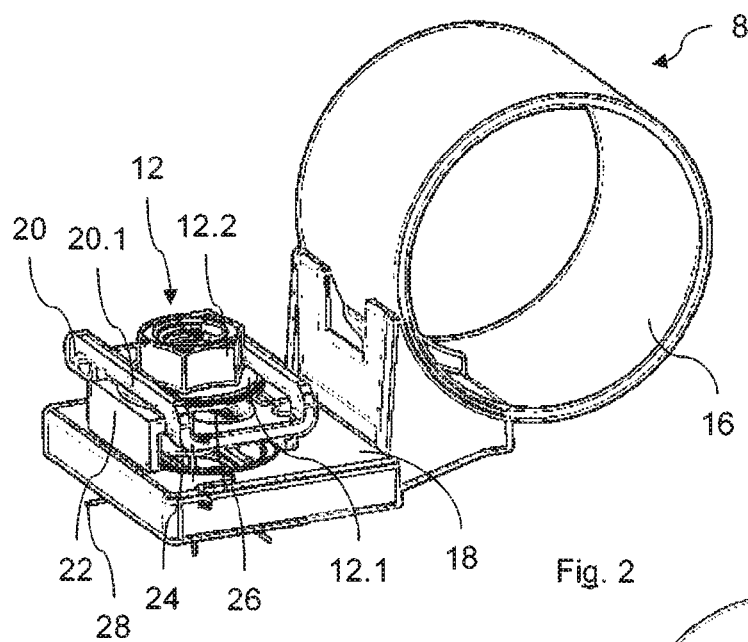
FIG. 2 is a perspective view of a cable set holder.

FIG. 2 shows a perspective view of the cable set holder 8. The cable set holder 8 includes a cable mounting portion 16 and a fastening portion 18. Cable mounting portion 16 and fastening portion 18 are designed in one piece and may be fabricated in plastic. Alternately, multiple-part configurations are likewise conceivable.

The cable mounting portion 16 is designed as a closed ring. The cable mounting portion 16 is configured to be openable. Because of this, introducing the cables 6 to be held can be simplified.

The fastening portion 18 includes a cage 20 in which the nut 12 is held in a loss-preventing manner. The nut 12 includes a flange 12.1 and a body 12.2. The flange 12.1 projects under the cage 20 and is thus secured in axial direction of the nut 12 so that the nut 12 cannot fall out. Cage 20 and nut 12 are arranged on a bracket 22. The fastening portion 18 includes a bore 24. The bore 24 is designed as an elongated hole and thus allows different relative positions between stud 10 and cable set holder 8, as a result the fastening portion is adjustable. The bracket 22 likewise includes an elongated bore 26. The cage 20 is configured in such a manner that the nut 12 can be shifted along the two elongated holes 24, 26 in order to be able to accomplish the function of adjustment.

The nut 12 can be inserted by reversible bending cage bars 20.1 so that the nut 12 is held in a loss-preventing manner but not captively. Other configurations with captive mountings of the nut 12 are likewise conceivable. The nut 12 can be turned relative to the fastening portion 18 of the cable set holder 8, in particular on the body 12.2 of the nut 12. To this end, the body 12.2 projects from the cage 20.

Furthermore, a clamping device 28 is provided. The clamping device 28 allows a provisional fixing of the cable set holder 8 on the stub 10. The clamping device 28 in this case is embodied as a wire element.

Figure 3:
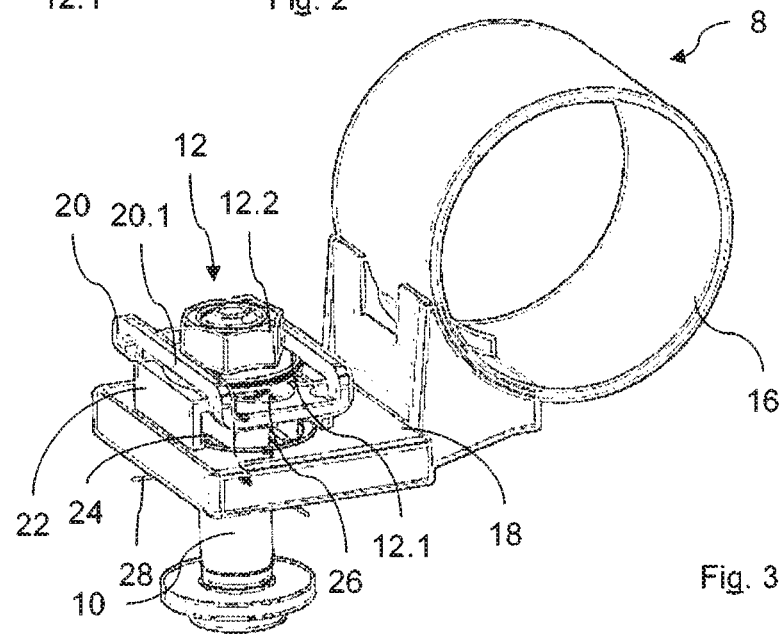
FIG. 3 is a perspective view of an assembled cable set holder.

FIG. 3 shows the assembled cable set holder 8 on the stud 10. The stud 10 projects through the elongated hole bores 24, 26. The nut 12 is screwed onto the stud 10.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A cable set holder for fastening at least one cable to a motor vehicle having a body component, the cable set holder comprising:
    a mounting portion configured to hold at least one cable;
    a fastening portion configured to fix the cable set holder on the body component, the fastening portion having a cage with reversible bending cage bars that each cooperate with a base of the cage to define an opening, the base of the cage defining an elongated bore; and
    a nut having a body portion and a flange portion, the nut arranged on the base of the cage, the flange portion projects into each of the openings defined by the reversible bending cage bars and the reversible bending cage bars cooperate to hold the nut such that the nut is axially movable relative to the elongated bore.

2. The cable set holder according to claim 1, wherein the flange portion has a diameter that is larger than a width of the cage and is captured thereby.

3. The cable set holder according to claim 2, wherein the body portion projects from the cage and has a drive feature formed therein.

4. The cable set holder according to claim 1, wherein elongated bore overlaps with a thread of the nut.

5. The cable set holder according to claim 1, wherein the cable mounting portion comprises a ring.

6. The cable set holder according to claim 5, wherein the cable mounting portion comprises a closable element.

7. The cable set holder according to claim 1, wherein the cable mounting portion and the fastening portion comprise a plastic component.

8. The cable set holder according to claim 1, wherein the cable mounting portion and the fastening portion comprise a one-piece component.

9. The cable set holder according to claim 1, further comprising a clamping device configured to pre-engage the body component.

10. A motor vehicle comprising a body component in combination with the cable set holder according to claim 1.

11. A cable set holder for fastening at least one cable to a motor vehicle having a body component, the cable set holder comprising:
    a mounting portion having a ring element configured to hold at least one cable;
    a fastening portion configured to fix the cable set holder on the body component and having a cage with reversible bending cage bars that each cooperate with a base of the cage to define an opening and the base defining an a first elongated bore formed therethrough, the fastening portion including a bracket that defines a second elongated bore, the cage coupled to the bracket such that the first elongated bore is aligned with the second elongated bore; and
    a nut including a flange portion that projects into each of the openings defined by the reversible bending cage bars and a body portion extending from the flange portion with a drive feature formed therein and a threaded hole, which overlaps with the first elongated bore in the fastening portion, the nut arranged on the base of the cage and the reversible bending cage bars cooperate to hold the nut such that the nut is axially movable relative to the first elongated bore.

* * * * *